US012659171B2

(12) United States Patent　　　(10) Patent No.:　US 12,659,171 B2

Mandokoro et al.　　　　　　　　(45) Date of Patent:　Jun. 16, 2026

(54) METHOD AND SYSTEM FOR MANAGING PERIPHERAL DEVICE FUNCTIONS USING MANIFEST FILES

(71) Applicant: Lenovo (Singapore) Pte. Ltd., Singapore (SG)

(72) Inventors: Nozomi Mandokoro, Kanagawa (JP); Alfredo Zugasti, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 150 days.

(21) Appl. No.: 18/625,809

(22) Filed: Apr. 3, 2024

(65) Prior Publication Data

US 2025/0317301 A1　　Oct. 9, 2025

(51) Int. Cl.
*H04L 9/32*　　　　(2006.01)
*G06F 21/82*　　　(2013.01)
*H04N 23/69*　　　(2023.01)

(52) U.S. Cl.
CPC ............ *H04L 9/3247* (2013.01); *G06F 21/82* (2013.01); *H04N 23/69* (2023.01)

(58) Field of Classification Search
CPC ..... H04L 9/3247; G06F 21/121; G06F 21/44; G06F 21/62; G06F 21/70; G06F 21/82; H04N 23/69
See application file for complete search history.

(56) References Cited

U.S. PATENT DOCUMENTS

| | | | | |
|---|---|---|---|---|
| 10,021,348 B1 * | 7/2018 | Imai | .............. | H04L 65/403 |
| 11,397,474 B1 * | 7/2022 | Kapinos | ........... | G06F 3/023 |
| 12,056,227 B2 * | 8/2024 | Antar | ............... | H04L 9/0643 |
| 2005/0074185 A1 * | 4/2005 | Jung | ................ | H04N 23/69 |
| | | | | 348/E5.042 |
| 2007/0263823 A1 * | 11/2007 | Jalava | ............. | H04M 3/568 |
| | | | | 379/202.01 |
| 2008/0005423 A1 * | 1/2008 | Jacobs | ........... | A61B 5/0002 |
| | | | | 710/62 |
| 2008/0108873 A1 * | 5/2008 | Gattani | .......... | A61B 1/045 |
| | | | | 382/128 |
| 2008/0313356 A1 * | 12/2008 | Blinn | ............. | H04L 51/04 |
| | | | | 710/7 |

(Continued)

OTHER PUBLICATIONS

Arias et al., "Privacy and Security in Internet of Things and Wearable Devices" [Online], Nov.6, 2015 [Retrieved on: Jan. 27, 2026], IEEE TMSCS 2015 , Retrieved from: < https://ieeexplore. ieee.org/stamp/stamp.jsp?tp=&arnumber=7321811 > (Year: 2015).*

*Primary Examiner* — Eric W Shepperd
(74) *Attorney, Agent, or Firm* — Osha Bergman Watanabe & Burton LLP

(57)　　　　　　ABSTRACT

A method may include obtaining a manifest file that includes various software definitions for various peripheral device functions. The method may further include determining whether the manifest file is signed by a predetermined cryptographic key. The method may further include obtaining, in response to determining that the manifest file is signed by the predetermined cryptographic key, a selection of a peripheral device function among the peripheral device functions in the manifest file. The method may further include performing the peripheral device function using a peripheral device in response to obtaining the selection of the peripheral device function.

12 Claims, 7 Drawing Sheets

(56)         References Cited

U.S. PATENT DOCUMENTS

| | | | | |
|---|---|---|---|---|
| 2016/0359941 | A1* | 12/2016 | Kvaal | H04L 65/403 |
| 2017/0099273 | A1* | 4/2017 | Kojima | H04W 12/041 |
| 2017/0351870 | A1* | 12/2017 | Knapp | G06F 21/71 |
| 2018/0137078 | A1* | 5/2018 | Kohtz | H04W 4/80 |
| 2019/0042779 | A1* | 2/2019 | Agerstam | G06F 21/554 |
| 2019/0052617 | A1* | 2/2019 | Chen | H04L 9/3234 |
| 2020/0334319 | A1* | 10/2020 | Kunz | G06F 16/9577 |
| 2022/0121325 | A1* | 4/2022 | Roberts | G06F 3/0481 |
| 2023/0093992 | A1* | 3/2023 | Shah | H04L 9/3242 |
| | | | | 713/171 |
| 2025/0251943 | A1* | 8/2025 | Thiruchengode Vajravel | |
| | | | | G06F 9/547 |

* cited by examiner

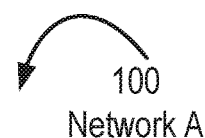

100
Network A

Teleconference Manager X 110

User Interface X 120

Peripheral Device Controller X 130

| Manifest File A 141 | Manifest File B 142 | Manifest File C 143 |
|---|---|---|
| Peripheral Device Function A 151 | Peripheral Device Function D 154 | Peripheral Device Function G 157 |
| Peripheral Device Function B 152 | Peripheral Device Function E 155 | Peripheral Device Function H 158 |
| Peripheral Device Function C 153 | Peripheral Device Function F 156 | Peripheral Device Function I 159 |
| Digital Signature X 171 | Digital Signature Y 172 | Digital Signature Z 173 |

| Peripheral Device A 161 | Peripheral Device B 162 | Peripheral Device C 163 |
|---|---|---|

FIG. 1

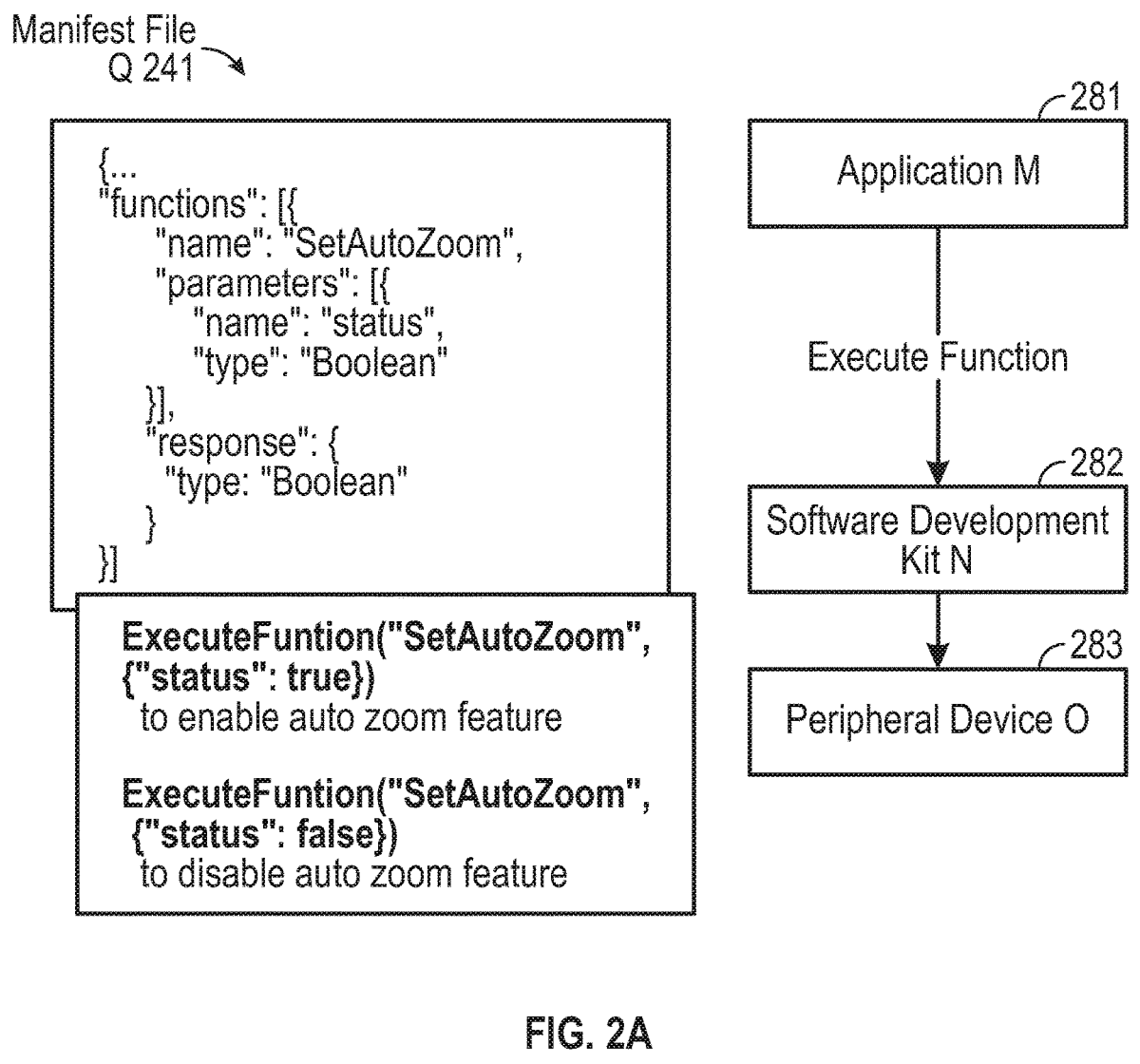

Manifest File
Q 241

```
{...
"functions": [{
    "name": "SetAutoZoom",
    "parameters": [{
        "name": "status",
        "type": "Boolean"
    }],
    "response": {
        "type: "Boolean"
    }
}]
```

**ExecuteFuntion("SetAutoZoom",
{"status": true})**
to enable auto zoom feature

**ExecuteFuntion("SetAutoZoom",
{"status": false})**
to disable auto zoom feature Application M ⟋281

Execute Function

Software Development
Kit N ⟋282

Peripheral Device O ⟋283

FIG. 2A

600
Computing
System

608
Output Device(s)

604
Non-Persistent
Storage

602
Computer
Processor(s)

606
Persistent
Storage

612
Communication
Interface

610
Input Device(s)

620
Network

622
Node X

624
Node Y

626
Client Device

METHOD AND SYSTEM FOR MANAGING PERIPHERAL DEVICE FUNCTIONS USING MANIFEST FILES

BACKGROUND

A software development kit (SDK) may include various application programming interfaces (APIs) in the form of on-device libraries of reusable functions for interfacing with a particular programming language or hardware device. For example, a vendor may provide their own software development kit for a particular peripheral device. Thus, a particular computer application may be integrated with various peripheral device functions based on a desired degree of SDK usage (e.g., some device functions may be enabled while others are disabled during integration). However, the main computer application may require special "wrapper" code for each peripheral device to achieve integration, thereby increasing the amount of implementing code necessary for each supported vendor and their respective peripheral devices.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, a manifest file that includes various software definitions for various peripheral device functions. The method further includes determining, by the computer processor, whether the manifest file is signed by a predetermined cryptographic key. The method further includes obtaining, by the computer processor and in response to determining that the manifest file is signed by the predetermined cryptographic key, a selection of a peripheral device function among the peripheral device functions in the manifest file. The method further includes performing, by the computer processor, the peripheral device function using a peripheral device in response to obtaining the selection of the peripheral device function.

In general, in one aspect, embodiments relate to a non-transitory computer readable medium storing instructions executable by a computer processor. The instructions obtain a manifest file that includes various software definitions for various peripheral device functions. The instructions further determine whether the manifest file is signed by a predetermined cryptographic key. The instructions further obtain, in response to determining that the manifest file is signed by the predetermined cryptographic key, a selection of a peripheral device function among the peripheral device functions in the manifest file. The instructions further perform the peripheral device function using a peripheral device in response to obtaining the selection of the peripheral device function.

In general, in one aspect, embodiments relate to a system that includes a peripheral device and a teleconference manager coupled to the peripheral device. The teleconference manager obtains a manifest file that includes various software definitions for various peripheral device functions. The teleconference manager further determines whether the manifest file is signed by a predetermined cryptographic key. The teleconference manager further obtains, in response to determining that the manifest file is signed by the predetermined cryptographic key, a selection of a peripheral device function among the peripheral device functions in the manifest file. The teleconference manager further performs the peripheral device function using the peripheral device in response to obtaining the selection of the peripheral device function.

In some embodiments, a teleconference manager obtains a subscription of an event among various events that are defined within a manifest file. An event notification may be presented in an application that is provided by the teleconference manager. The event notification may be presented in response to a peripheral device triggering the event. In some embodiments, a graphical user interface (GUI) is generated for a teleconference manager in response to obtaining a selection of a peripheral device function. The GUI may be generated based on various parameters that are included in the peripheral device function. In some embodiments, a predetermined list is obtained for various peripheral devices. A manifest file may be obtained for a peripheral device among the peripheral devices in the predetermined list. A determination may be made whether the peripheral device is associated with the predetermined list. A peripheral device function corresponding to the manifest file may be disabled, in response to determining that the peripheral device is not associated with the predetermined list.

In some embodiments, a manifest file is obtained for a peripheral device. A validation process may be performed on the manifest file based on a predetermined criterion. Performing the validation process may include generating a digital signature using a private cryptographic key.

In some embodiments, a manifest file is obtained. A determination may be made whether the manifest file is signed by a digital signature. A peripheral device function may be performed using a peripheral device in response to determining that the manifest file is signed by a private cryptographic key.

In some embodiments, a GUI is presented on a display device. The GUI may include various GUI objects. A selection of a GUI object within the GUI may be obtained from a user device. The GUI object may be associated with a peripheral device. A manifest file may be selected from various manifest files based on the selection of the GUI object. Various peripheral device functions may be presented, within the GUI, based on the selected manifest file. In some embodiments, a peripheral device is a camera device, and a peripheral device function is an autozoom function. In some embodiments, a peripheral device includes a microphone device, and a peripheral device function identifies, within a GUI, a speaker among various speakers that is providing an audio input to the microphone device. In some embodiments, a manifest file is a JavaScript Object Notation (JSON) file.

In light of the structure and functions described above, embodiments disclosed herein may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 1, 2A, 2B, and 3 show systems in accordance with one or more embodiments.

DETAILED DESCRIPTION

Figure 2B:
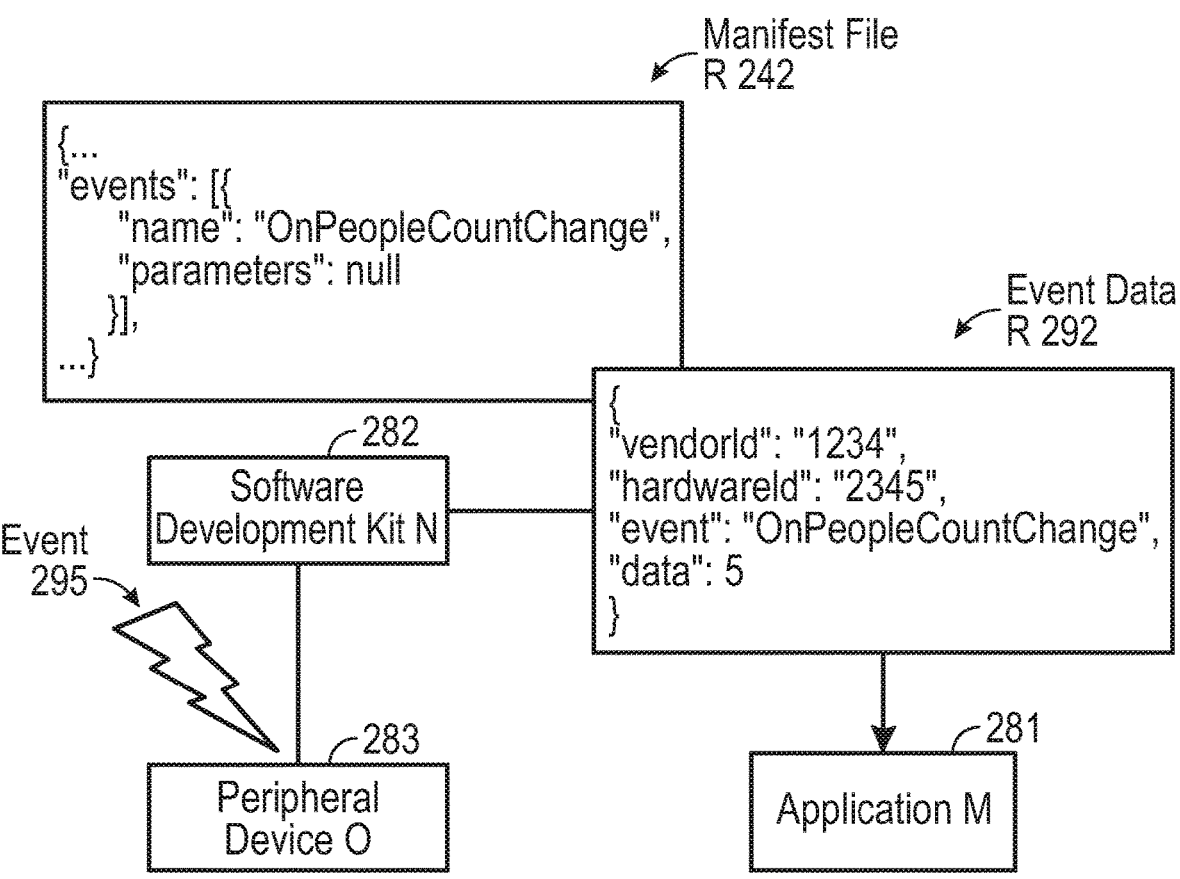

Specific embodiments of the invention will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments are directed to systems and methods for managing peripheral devices using manifest files. More specifically, some embodiments include applications (e.g., a software application for managing teleconferences) that use manifest files to execute various functions with peripheral devices. Rather than tailoring specific implementing code for interacting with a specific peripheral device, a manifest file may define a variety of function calls for triggering different peripheral device functions by a computer application. These function calls in the manifest file may also have associated parameters and properties of a function call, as well as defined acknowledgements received in response to executing a peripheral device function. In some embodiments, manifest files are validated using cryptographic signatures and other security mechanisms (e.g., whitelisting and/or blacklisting specific manifest files), such as to confirm the manifest file may be trusted by an application. Through validation, peripheral device functions may be managed (e.g., enabled and/or disabled) such that only manifest files from trusted authorities are used by the application.

In some embodiments, a manifest file further defines notifications based on events occurring at a peripheral device. For example, when a microphone device detects a particular user speaking, the microphone device may trigger an event. The event may be subsequently relayed as event data to a computer application. The event data may be understood by the computer application using event definitions described in the manifest file. Through interpreting event data based on the manifest filed, the event data may be presented as an event notification as well as used in various operations performed by the corresponding application.

Furthermore, some embodiments address several technological problems that currently exist for integrating third party peripheral devices into computer applications. For different peripheral devices from different vendors, an application may require a different software implementation for each peripheral device's vendor in order to execute peripheral device functions. These different software implementations may be required to interface with an application, e.g., using a specific software development kit (SDK). Some past technological solutions to such problems involved the use of wrapper code for each vendor's software development kit. For example, if an application developer has three vendors to support, three sets of wrapper code may be required to use each vendor's software development kit. In the software context, wrapper code may refer to programs that literally "wrap" around other program components, such as for insuring compatibility or interoperability between different software structures. To avoid the requirement of having computer applications communicate with a peripheral device using its respective wrapper code, manifest files provide a computer software solution for managing peripheral device functions from trusted entities.

FIG. 1 shows a network (e.g., network A (100)) that includes a teleconference manager (e.g., teleconference manager X (110)) coupled to various peripheral devices (e.g., peripheral device A (161), peripheral device B (162), peripheral device C (163)) in accordance with one or more embodiments. In particular, a teleconference manager may include hardware and/or software for hosting one or more teleconference services, such as audio conferencing, video conferencing, group messaging, scheduling meetings, and placing calls to meeting participants. Peripheral devices may include camera devices, microphone devices, speaker devices, speakerphone devices, printing devices, conference hub devices, videobar devices, audio adapters, video adapters, and/or composite devices that include functionality of two or more peripheral devices.

In some embodiments, an application (e.g., teleconference manager X (110)) may include one or more peripheral device controllers (e.g., peripheral device controller X (130)). More specifically, a peripheral device controller may include hardware and/or software for defining a communication interface between an application (e.g., teleconference manager X (110)) and one or more peripheral devices (e.g., peripheral device A (161), peripheral device B (162), peripheral device C (163)).

In some embodiments, for example, a peripheral device controller uses one or more manifest files (e.g., manifest file A (141), manifest file B (142), manifest file C (143)) to define various peripheral device functions (e.g., peripheral device function A (151), peripheral device function B (152), peripheral device function C (153), peripheral device function D (154), peripheral device function E (155), peripheral device function F (156), peripheral device function G (157), peripheral device function H (158), peripheral device function I (159)) executable by a requesting application. For example, a manifest file may specify multiple function calls for a peripheral device. In response to receiving a particular function call, a respective peripheral device may perform a particular peripheral behavior. This peripheral behavior may be assigned by a vendor responsible for the peripheral device's functionality. The manifest file may not include implementing code for performing any peripheral device functions, but merely data structure definitions for executing calls to a respective peripheral device.

In some embodiments, a manifest file is a JavaScript Object Notation (JSON) file. However, other data interchange formats are contemplated for implementing manifest files, such as programming languages that also use human readable code or plain text formats, such as Extensible Markup Language (XML) files and binary JSON (BSON) files. Additionally, a manifest file may be implemented using a machine-readable code file that is compiled using a programming language.

Turning to various types of peripheral devices, one example of a peripheral device is a camera device. As such, the manifest file may define various peripheral device functions for the camera device that can be called by a teleconference manager or other application. Examples of peripheral device functions for the camera device may include autozoom functions, autofocus functions, person framing functions, an automated high dynamic range (HDR) function, and various video filter functions. For a microphone device, examples of peripheral device functions may include a speaker tracking function, a transcription function, a background noise cancellation function, and a person recognition function (e.g., a teleconference manager may use a person recognition function to identify, within a graphical user interface (GUI), a speaker among multiple speakers that is providing an audio input to a microphone device).

In another example, a manifest file for a camera device may include a "SetAutoZoom" function that enables an application to call an autozoom function without using a wrapper. Performing the "SetAutoZoom" function call may require an application to use a "Device_Reboot" in a dependency property thus causing the peripheral device to be rebooted after calling the "SetAutoZoom" function. In another example, a "SetCameraZoom" function may require a camera stream to be online. As such, a manifest file may define a "Liveview_On_required" property within a dependency property in an application that disables control of "SetCameraZoom" when camera stream is not online.

In some embodiments, a manifest file includes one or more digital signatures (e.g., digital signature X (171), digital signature Y (172), digital signature Z (173)) in response to being signed using one or more cryptographic keys. For example, a cryptographic key may be used to sign identification tokens, access tokens, and Security Assertion Markup Language (SAML) assertions associated with a particular manifest file. Additionally, a manifest file that is also a JSON file may be signed using a JSON web key (JWK) that is based on a public cryptographic key for validating a digital signature of a signed JSON web token (JWT). The JWT standard is an open standard (i.e., based on Request for Comments (RFC) 7519) that defines a compact and self-contained way for securely transmitting information between parties using JSON objects. As such, a manifest file may be verified and trusted based on or more digital signatures embedded in a respective manifest file using JWTs.

Moreover, a JSON web key set (JWKS) may be a set of keys containing various public cryptographic keys that may be used to verify one or more manifest files verifying by one or more authorization servers. For example, a digital signature may be generated using RSA Signature with SHA256 (RS256) signing algorithm as well as other cryptographic algorithms. With the RS256 signing algorithm, a pair of public-private keys may be used to encrypt and decrypt signing data. As such, a JWT header and payload may be hashed by the issuer using Secure Hash Algorithm 256-bit (SHA256 algorithm), and subsequently encrypted with a private key and the Rivest-Shamir-Adleman (RSA) encryption technique. Likewise, JWTs may also be signed using a secret algorithm (e.g., a Hash-based Message Authentication Code (HMAC)). Digital signatures in manifest files may also certify that only the party holding the private key is the entity responsible for signing the respective manifest file.

Moreover, a teleconference manager may include one or more user interfaces (e.g., user interface X (120)) coupled to one or more peripheral device controllers (e.g., peripheral device controller X (130)). For example, a user interface may be an audio interface, a GUI, and an input device for implementing one or more teleconference services with a teleconference manager. For example, the teleconference manager may have an audio user interface where various application functions are performed using audio commands. Likewise, a GUI may include various GUI buttons presented on a display device to a user, which may be selected using various user inputs (e.g., voice commands, touch inputs to a touchscreen, or a user input to an input device). As such, various application functions, peripheral device functions, and other computer functions may be executed through a selection of a respective GUI button for the particular function. A teleconference manager, a peripheral device controller, and/or one or more peripheral devices may include a computer system similar to computing system (600) described below in FIGS. 6A and 6B and the accompanying description.

FIG. 2A shows an example of executing a peripheral device function using a manifest file in accordance with one or more embodiments. As shown, a vendor of peripheral device O (283) provides a function call definition in manifest file Q (241), i.e., for a "SetAutoZoom" function. An application M (281) calls the "SetAutoZoom" function using a function call identifying the "SetAutoZoom" function along with various parameters required to execute the particular function. The function call is received by a software development kit N (282) for the peripheral device O (283), and subsequently a response is returned by the peripheral device O (283). As such, the response may indicate to a peripheral device controller (not shown) that an auto zoom feature is enabled or disabled.

FIG. 2B shows an example of an application receiving an event notification based on a manifest file in accordance with one or more embodiments. As shown, an event (295) is triggered at peripheral device O (283). In response to the event (295), the peripheral device O (283) uses a software development kit N (282) to communicate an event notification based on event (295) to application M (281). The event notification includes event data R (292). At the application M (281), the manifest file R (242) defines the event for interpretating the event data R (292). As such, the application M (281) may present a notification in a GUI that the number of people in a teleconference meeting has changed based on event (295).

Figure 3:
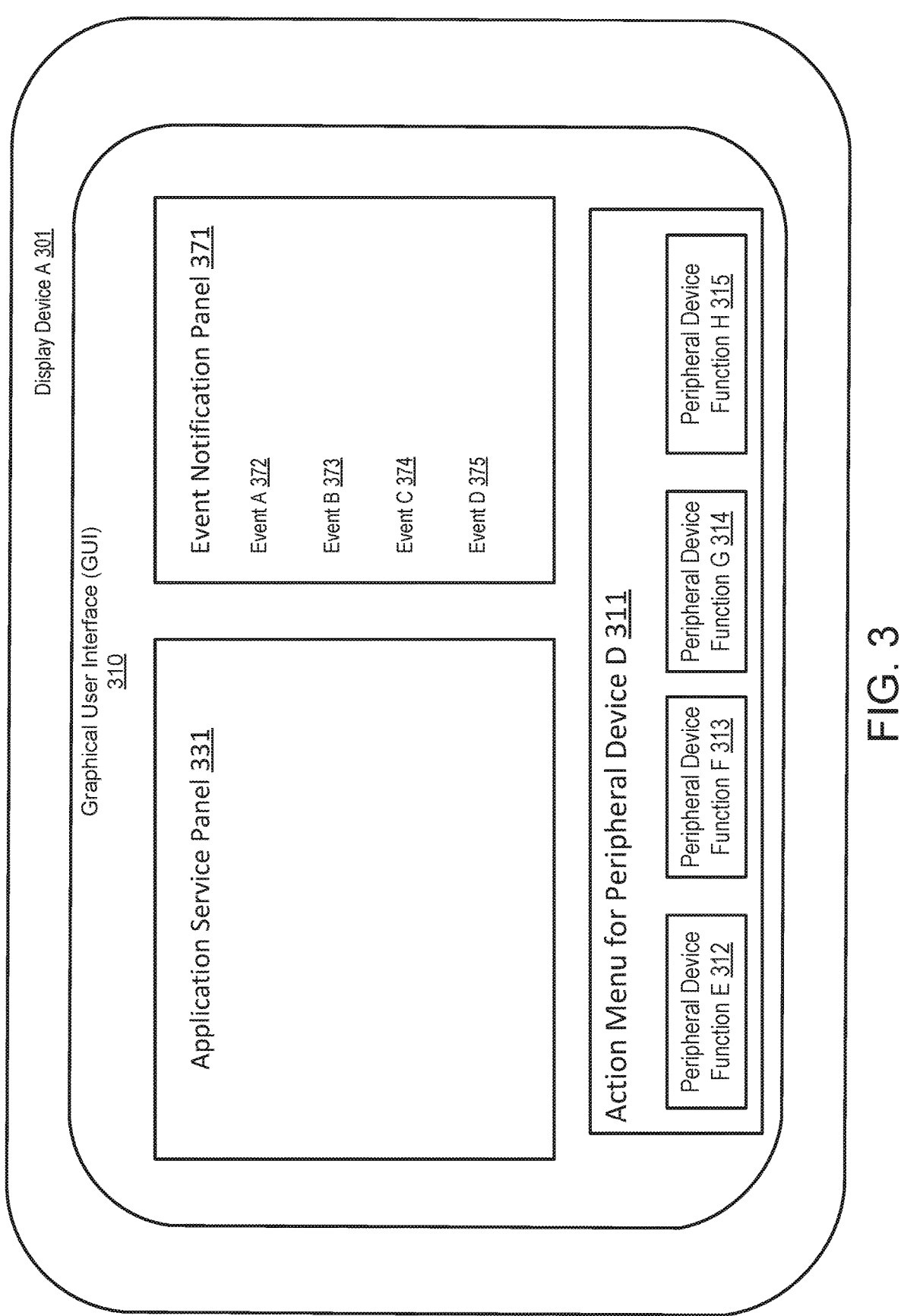

FIG. 3 shows a GUI in accordance with one or more embodiments. Here, a GUI (310) is presented on a display device (301). The GUI (310) includes an application service panel (331) that is GUI pane provided by a main computer application. The GUI (310) further includes another GUI pane, i.e., an event notification panel (371), that provides event information regarding various peripheral devices, e.g., identifying event A (372), event B (373), event C (374), and event D (375). The GUI (310) further includes an action menu (311) for a peripheral device D (not shown), where a user may select different peripheral device functions to be performed by peripheral device D. These peripheral device functions include peripheral device function E (312), peripheral device function F (313), peripheral device function G (314), and peripheral device function H (315). The events (372, 373, 374, 375) and the peripheral device functions (312, 313, 314, 315) are determined by the main computer application based on manifest files that are obtained for various peripheral devices currently connected to the main computer application.

In some embodiments, an application automatically generates a different GUI based on which manifest files are being used. After performing a validation process, for example, an application may determine which peripheral device functions may be performed using a GUI provided by the application. As such, the application may populate an action menu with various GUI icons and/or GUI buttons that may be selected to perform different peripheral device functions. Likewise, the application may determine begin monitoring for various events upon receipt and reading the manifest files for connected peripheral devices. As such, an event notification panel may be populated in real-time with event notifications based on interpreting event data using manifest files.

While FIGS. 1, 2A, 2B, and 3 show various configurations of components, other configurations may be used without departing from the scope of the disclosure. For example, various components in FIGS. 1, 2A, 2B, and 3 may be combined to create a single component. As another example, the functionality performed by a single component may be performed by two or more components.

Figure 4:
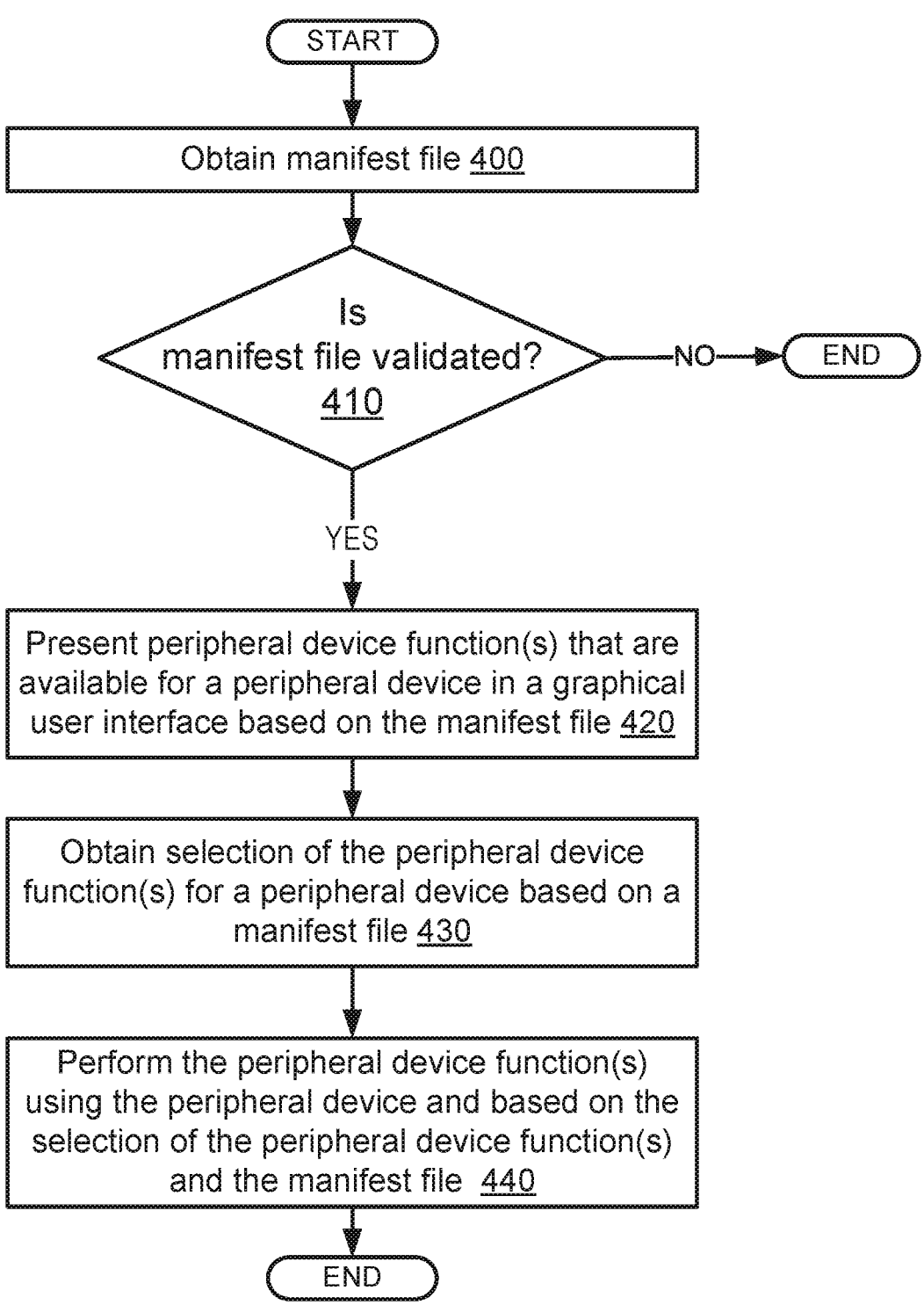
FIGS. 4 and 5 show flowcharts in accordance with one or more embodiments.

Next, FIG. 4 shows a flowchart in accordance with one or more embodiments. Specifically, FIG. 4 describes a general method for performing one or more peripheral device functions using manifest files in accordance with one or more embodiments. One or more blocks in FIG. 4 may be performed by one or more components as described in FIGS. 1, 2A, 2B, and 3 (e.g., peripheral device controller X (130)). While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a manifest file is obtained in accordance with one or more embodiments. For example, a manifest file may be downloaded by a user device from one or more remote servers. Likewise, a manifest file may be received directly from a peripheral device. Additionally, an application associated with the peripheral device may transmit the manifest file to one or more peripheral device controllers. The manifest file may be similar to the manifest file described above in FIGS. 1, 2A, and 2B and the accompanying description.

In Block 410, a determination is made whether a manifest file is validated in accordance with one or more embodiments. For example, manifest files may be validated to securely authenticate whether the manifest file is from a trusted source. Additionally, a validation process may be used to verify whether the manifest file is the most current file for a respective peripheral device. In some embodiments, an application may use a public cryptographic key to determine whether the manifest file is signed by a private cryptographic key associated with a trusted authority. If the manifest file is valid, the process may proceed to Block 420. If the manifest file cannot be validated, the process may end.

For illustrative purposes, a vendor may prepare a manifest.json file to define various signature thumbprints. The manifest.json file may be subsequently signed by an authentication server administering a teleconference manager using a JWT private key. Through a validation process, the teleconference manager may thereby detect tampering with the original manifest.json file by analyzing a digital signature defined in the manifest.json file.

In some embodiments, a manifest file is validated using whitelisting and/or blacklisting processes. For example, a manifest file may have identification information to verify the source of the manifest file, the type of manifest file (e.g., which manifest file version for a specific type of peripheral device), and/or history information (e.g., the date the manifest file was created). Using identification information, an application may compare manifest file data with one or more predetermined lists (e.g., whitelists and/or blacklists). Whitelisting a manifest file may enable performance of various peripheral device functions associated with the whitelisted file. On the other hand, blacklisting may be used by an application to disable various peripheral device functions associated with a blacklisted file. Whitelisting and/or blacklisting may be performed by analyzing manifest file data using identification information and other metadata. As such, an application may load manifest files on a predetermined whitelist and/or refuse to load manifest files on a predetermined blacklist. In some embodiments, a manifest file may be added to a blacklist after previously being validated using a private cryptographic key.

In Block 420, one or more peripheral device functions that are available for a peripheral device are presented in a GUI based on a manifest file in accordance with one or more embodiments. For example, an application may read one or more manifest files to determine which peripheral device functions are available to a user. In some embodiments, an application generates an action menu in a GUI where various GUI buttons indicate available peripheral device functions for various connected peripheral devices to the application.

In Block 430, a selection of one or more peripheral device functions are obtained for a peripheral device based on a manifest file in accordance with one or more embodiments. In particular, an application may obtain a user input from an input device that selects one or more peripheral device functions. In some embodiments, a peripheral device function is automatically selected based on detected events associated with an application as well as one or more peripheral devices.

In Block 440, one or more peripheral device functions are performed using a peripheral device and based on a selection of one or more peripheral device functions and a manifest file in accordance with one or more embodiments. After obtaining a selection of one or more peripheral device functions, an application may execute the corresponding peripheral device functions using the respective peripheral devices based on one or more manifest files.

Figure 5:
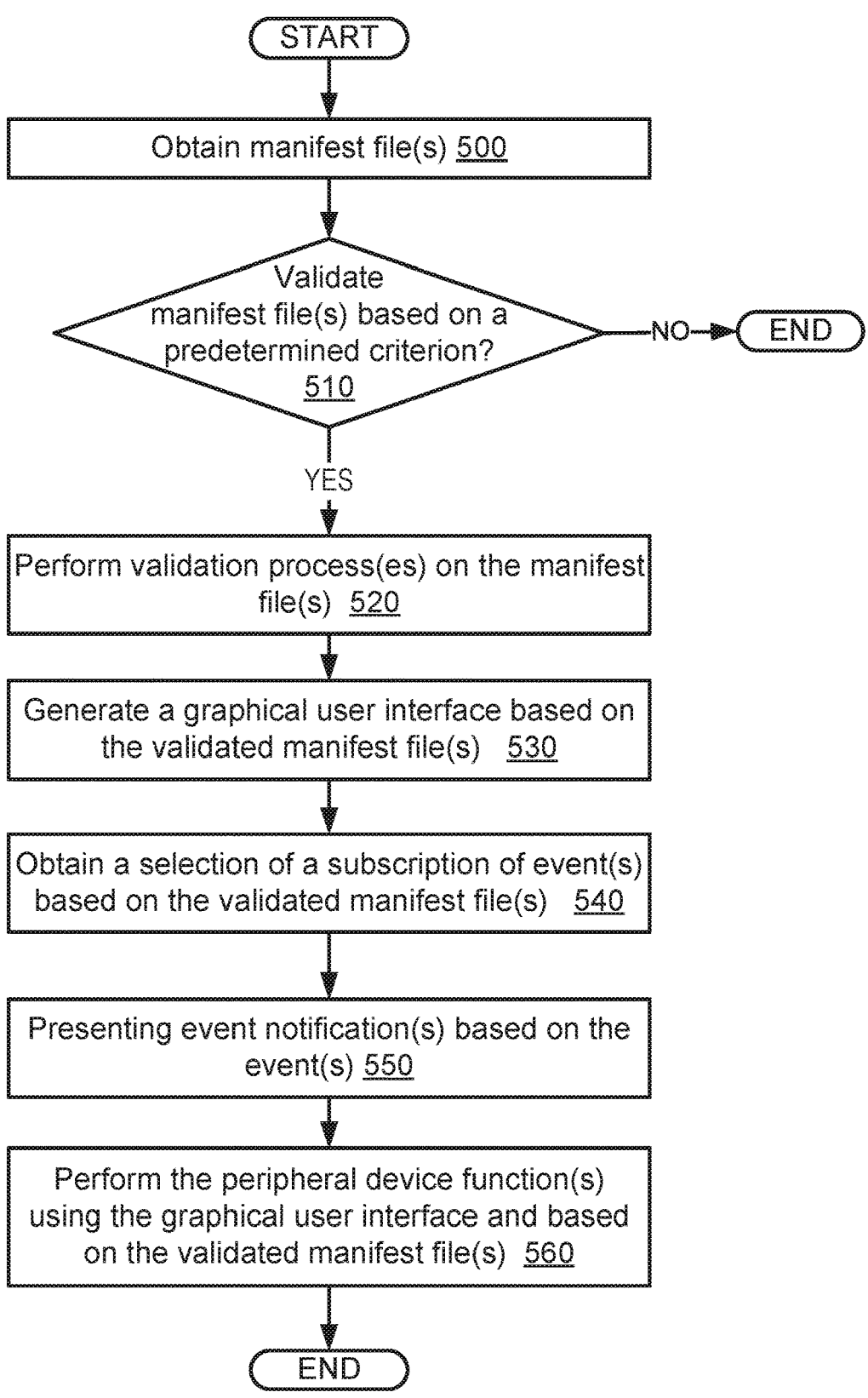

FIG. 5 shows a flowchart in accordance with one or more embodiments. Specifically, FIG. 5 describes a specific method for managing peripheral device functions using one or more manifest files in accordance with one or more embodiments. One or more blocks in FIG. 5 may be performed by one or more components as described in FIGS. 1, 2A, 2B, and 3. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, one or more manifest files are obtained in accordance with one or more embodiments.

In Block 510, a determination is made whether to validate one or more manifest files based on a predetermined criterion in accordance with one or more embodiments. For example, a vendor's server may provide one or more manifest files to an authentication server for validation. A determination may be made whether the manifest file comes from a trusted entity, e.g., to protect data security or that the manifest file has interoperability with a particular application. Likewise, a manifest file may be analyzed whether any peripheral device functions have hardware and/or software conflicts, or any other criteria, such as a more recent manifest file is available from the peripheral device's vendor. If a determination is made to validate a manifest file, the process may proceed to Block 520. If a determination is made to not validate the manifest file (e.g., the source of the manifest file cannot be trusted), the process may end.

In Block 520, one or more validation processes are performed on one or more manifest files in accordance with one or more embodiments. After determining that a manifest file may be trusted, one or more validation processes may be performed on a particular manifest file. For example, a manifest file may be signed with a digital signature using a private cryptographic key as well as entered into one or more predetermined whitelists.

In Block 530, a GUI is generated based on one or more validated manifest files in accordance with one or more embodiments. For example, an application may analyze one or more manifest files for available peripheral device functions available to a user. Afterwards, a GUI may be generated using GUI icons identifying which peripheral device functions are available for use with the application. In particular, various parameters described for various peripheral device functions may provide inputs for generating the GUI. In some embodiments, an application may provide a GUI in lieu of a software application operated on the peripheral device. Thus, multiple peripheral devices may offer different functionality within the same GUI without requiring multiple distinct GUIs for each peripheral device connected to a primary application.

In Block 540, a selection of a subscription of one or more events is obtained based on one or more validated manifest files in accordance with one or more embodiments. An application may obtain a selection of one or more subscriptions of various events associated with different peripheral devices. The selection may be made by a user using a user interface coupled to the application. In a GUI, for example, a user may select different event notifications for different events that may be triggered by a respective peripheral device. For example, a microphone device may identify a speaker in a room with multiple speakers. After selecting an event notification for identifying a current speaker in a teleconference, an application may identify using a visual indicator in a graphical interface the current speaker.

In Block 550, one or more event notifications are presented based on one or more events in accordance with one or more embodiments. The event notifications may be presented using an output device, such as a GUI on a display device.

In Block 560, one or more peripheral device functions are performed using a GUI and based on one or more validated manifest files in accordance with one or more embodiments.

Figure 6A:
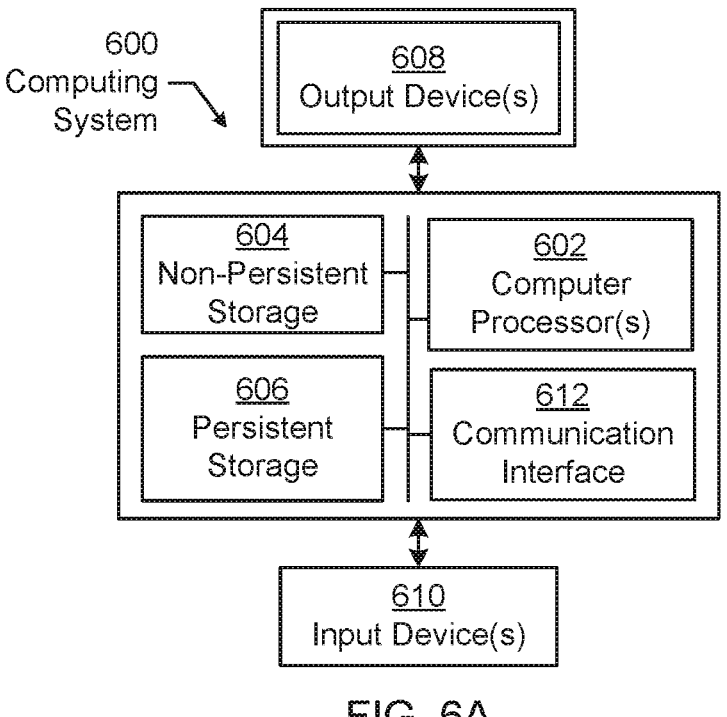
FIGS. 6A and 6B show a computing system in accordance with one or more embodiments.

Embodiments may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 6B:
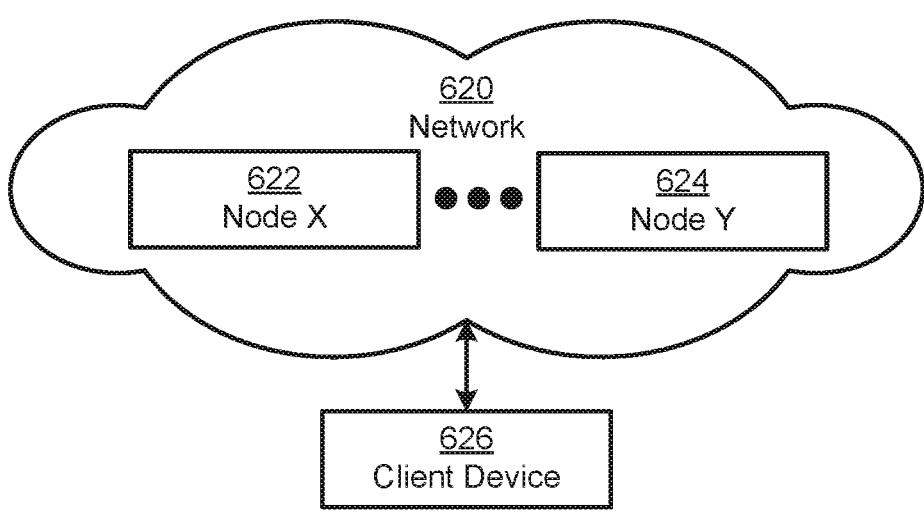

The computing system (600) in FIG. 6A may be connected to or be a part of a computer network. For example, as shown in FIG. 6B, the computer network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the computer network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a GUI on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

Once data is obtained, such as by using techniques described above or from storage, the computing system, in performing one or more embodiments of the disclosure, may extract one or more data items from the obtained data. For example, the extraction may be performed as follows by the computing system (600) in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the disclosure.

While the technology has been described with respect to a limited number of embodiments, those skilled in the art, having benefit of this disclosure, will appreciate that other embodiments can be devised which do not depart from the scope of the technology as disclosed herein.

What is claimed is:

1. A method, comprising:
obtaining, by a computer processor, a first manifest file comprising a first digital signature and a first plurality of software definitions for a plurality of peripheral device functions;
obtaining, by the computer processor, a second manifest file comprising a second digital signature and a second plurality of software definitions for the plurality of peripheral device functions;
determining, by the computer processor, whether the second manifest file is signed by an authorization server using a predetermined cryptographic key;
disabling, by the computer processor in response to the second manifest file being signed by a different authority than the authorization server, the plurality of peripheral device functions;
determining, by the computer processor, whether the first manifest file is signed by the predetermined cryptographic key;
obtaining, by the computer processor and in response to determining that the first manifest file is signed by the predetermined cryptographic key, a selection of a first peripheral device function among the plurality of peripheral device functions in the first manifest file; and
performing, by the computer processor, the first peripheral device function using a first peripheral device in response to obtaining the selection of the first peripheral device function.

2. The method of claim 1, further comprising:
obtaining, by a teleconference manager, a subscription of a first event among a plurality of events that are defined within the first manifest file; and
presenting an event notification in an application that is provided by the teleconference manager, wherein the event notification is presented in response to the first peripheral device triggering the first event.

3. The method of claim 1, further comprising:

generating a graphical user interface (GUI) for a teleconference manager in response to obtaining the selection of the first peripheral device function, wherein the GUI is generated based on a plurality of parameters that are included in the first peripheral device function.

4. The method of claim 1, further comprising:

obtaining a predetermined list for a plurality of peripheral devices;

obtaining a second manifest file for a second peripheral device among the plurality of peripheral devices;

determining whether the second peripheral device is associated with the predetermined list; and disabling, in response to determining that the second peripheral device is not associated with the predetermined list, a second peripheral device function corresponding to the second manifest file.

5. The method of claim 1, further comprising:

obtaining a second manifest file for a second peripheral device; and performing a validation process on the second manifest file based on a predetermined criterion, wherein performing the validation process comprises generating a first digital signature using a private cryptographic key.

6. The method of claim 5, further comprising:

obtaining the second manifest file;

determining whether the second manifest file is signed by the first digital signature; and performing a second peripheral device function using a second peripheral device in response to determining that the second manifest file is signed by the private cryptographic key.

7. The method of claim 1, further comprising:

presenting a graphical user interface (GUI) on a display device, wherein the GUI comprises a plurality of GUI objects;

obtaining, from a user device, a selection of a first GUI object within the GUI, wherein the first GUI object is associated with the first peripheral device;

selecting the first manifest file among a plurality of manifest files based on the selection of the first GUI object; and presenting, within the GUI, a plurality of peripheral device functions based on the first manifest file.

8. The method of claim 1, wherein the first peripheral device is a camera device, and wherein the first peripheral device function is an auto-zoom function.

9. The method of claim 1, wherein the first peripheral device comprises a micro-phone device, and wherein the first peripheral device function identifies, within a graphical user interface (GUI), a speaker among a plurality of speakers that is providing an audio input to the microphone device.

10. The method of claim 1, wherein the first manifest file is a JavaScript Object Notation (JSON) file.

11. A non-transitory computer readable medium storing instructions executable by a computer processor, the instructions being configured to perform a method comprising:

obtaining a first manifest file comprising a first digital signature and a first plurality of software definitions for a plurality of peripheral device functions;

obtaining a second manifest file comprising a second digital signature and a second plurality of software definitions for the plurality of peripheral device functions;

determining whether the second manifest file is signed by an authorization server using a predetermined cryptographic key;

disabling, in response to the second manifest file being signed by a different authority than the authorization server, the plurality of peripheral device functions;

determining whether the first manifest file is signed by the predetermined cryptographic key;

obtaining, in response to determining that the first manifest file is signed by the predetermined cryptographic key, a selection of a first peripheral device function among the plurality of peripheral device functions in the first manifest file; and performing the first peripheral device function using a first peripheral device in response to obtaining the selection of the first peripheral device function.

12. A system, comprising:

a first peripheral device comprising a first hardware processor;

a teleconference manager comprising a second hardware processor, wherein the teleconference manager is coupled to the first peripheral device, wherein the teleconference manager is configured to perform a method comprising:

obtaining a first manifest file comprising a first digital signature and a first plurality of software definitions for a plurality of peripheral device functions;

obtaining a second manifest file comprising a second digital signature and a second plurality of software definitions for the plurality of peripheral device functions;

determining whether the second manifest file is signed by an authorization server using a predetermined cryptographic key;

disabling, in response to the second manifest file being signed by a different authority than the authorization server, the plurality of peripheral device functions;

determining whether the first manifest file is signed by the predetermined cryptographic key;

obtaining, in response to determining that the first manifest file is signed by the predetermined cryptographic key, a selection of a first peripheral device function among the plurality of peripheral device functions in the first manifest file; and performing the first peripheral device function using the first peripheral device in response to obtaining the selection of the first peripheral device function.

* * * * *